United States Patent
Raveh et al.

(10) Patent No.: US 11,613,272 B2
(45) Date of Patent: Mar. 28, 2023

(54) LANE UNCERTAINTY MODELING AND TRACKING IN A VEHICLE

(71) Applicant: GM Global Technology Operations LLC, Detroit, MI (US)

(72) Inventors: Alon Raveh, Jerusalem (IL); Shaul Oron, Rehovot (IL); Bat El Shlomo, Hod Hasharon (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 82 days.

(21) Appl. No.: 17/024,277

(22) Filed: Sep. 17, 2020

(65) Prior Publication Data

US 2022/0080997 A1 Mar. 17, 2022

(51) Int. Cl.
| | |
|---|---|
| *B60W 60/00* | (2020.01) |
| *G06T 7/73* | (2017.01) |
| *G06T 7/246* | (2017.01) |
| *B60W 40/06* | (2012.01) |
| *B60W 30/12* | (2020.01) |
| *G01C 21/00* | (2006.01) |
| *G06V 20/56* | (2022.01) |

(52) U.S. Cl.
CPC .......... *B60W 60/001* (2020.02); *B60W 30/12* (2013.01); *B60W 40/06* (2013.01); *G01C 21/3822* (2020.08); *G06T 7/251* (2017.01); *G06T 7/75* (2017.01); *G06V 20/588* (2022.01); *B60W 2420/42* (2013.01); *B60W 2420/52* (2013.01); *B60W 2552/53* (2020.02); *G06T 2207/30241* (2013.01); *G06T 2207/30256* (2013.01)

(58) Field of Classification Search
CPC .... B60W 60/001; B60W 30/12; B60W 40/06; B60W 2552/53; G01C 21/3822; G06V 20/588; G06T 2207/30241; G06T 2207/30256
See application file for complete search history.

(56) References Cited

U.S. PATENT DOCUMENTS

| | | | |
|---|---|---|---|
| 2017/0178617 A1* | 6/2017 | Christoph | G10L 21/0208 |
| 2017/0277716 A1* | 9/2017 | Giurgiu | G06F 16/23 |
| 2018/0048915 A1* | 2/2018 | Jeon | H04N 19/176 |
| 2018/0189576 A1* | 7/2018 | Joshi | G01B 11/30 |
| 2020/0004259 A1* | 1/2020 | Gulino | G05D 1/0219 |
| 2020/0133294 A1* | 4/2020 | Viswanathan | G05D 1/0088 |
| 2021/0229705 A1* | 7/2021 | Tsuji | B60W 60/0018 |

\* cited by examiner

*Primary Examiner* — Thomas Ingram
(74) *Attorney, Agent, or Firm* — Cantor Colburn LLP

(57) ABSTRACT

Systems and methods involve obtaining observation points of a lane line using one or more sensors of a vehicle. Each observation point indicates a location of a point on the lane line. A method includes obtaining uncertainty values, each uncertainty value corresponding with one of the observation points. A lane model is generated or updated using the observation points. The lane model indicates a path of the lane line. An uncertainty model is generated or updated using the uncertainty values corresponding with the observation points. The uncertainty model indicates uncertainty associated with each portion of the lane model.

18 Claims, 3 Drawing Sheets

LANE UNCERTAINTY MODELING AND TRACKING IN A VEHICLE

INTRODUCTION

The subject disclosure relates to lane uncertainty modeling and tracking in a vehicle.

Vehicles (e.g., automobiles, trucks, construction equipment, farm equipment, automated factory equipment) increasingly employ sensors to obtain information about the vehicle and its environment. Semi-autonomous operation (e.g., lane departure correction, automated steering or braking) and autonomous operation of a vehicle may require the ability to navigate to a destination while staying within lane lines, for example. Detecting and tracking all lane lines in a vehicle's vicinity facilitates identifying upcoming turns, avoiding traffic, and other operations. Lane models are developed and updated based on observed points of the lanes. Uncertainty in the observed points can result in uncertainty in the lane models. Accordingly, it is desirable to provide lane uncertainty modeling and tracking in a vehicle.

SUMMARY

In one exemplary embodiment, a method includes obtaining observation points of a lane line using one or more sensors of a vehicle. Each observation point indicates a location of a point on the lane line. The method also includes obtaining uncertainty values, each uncertainty value corresponding with one of the observation points. A lane model is generated or updated using the observation points. The lane model indicates a path of the lane line. An uncertainty model is generated or updated using the uncertainty values corresponding with the observation points. The uncertainty model indicates uncertainty associated with each portion of the lane model.

In addition to one or more of the features described herein, the obtaining the observation points includes obtaining detections with the one or more sensors.

In addition to one or more of the features described herein, the one or more sensors include a camera, a lidar system, or a radar system.

In addition to one or more of the features described herein, the obtaining the observation points includes processing the detections, using a processor, to identify the lane line.

In addition to one or more of the features described herein, the obtaining the uncertainty values includes the processor determining the uncertainty value corresponding with each of the observation points.

In addition to one or more of the features described herein, the obtaining the observation points and the uncertainty values includes obtaining mean and variance values, respectively.

In addition to one or more of the features described herein, the obtaining the variance values includes obtaining values in square-meters.

In addition to one or more of the features described herein, the generating or updating the lane model using the observation points includes, respectively, initializing or updating a first recursive least squares (RLS) adaptive filter.

In addition to one or more of the features described herein, the generating or updating the uncertainty model using the uncertainty values includes, respectively, initializing or updating a second RLS adaptive filter.

In addition to one or more of the features described herein, the method also includes controlling vehicle operation based on the lane model and the uncertainty model.

In another exemplary embodiment, a system includes one or more sensors of a vehicle configured to provide observation points of a lane line. Each observation point indicates a location of a point on the lane line, and uncertainty values, each uncertainty value corresponding with one of the observation points. The system also includes a controller to generate or update a lane model using the observation points. The lane model indicates a path of the lane line. An uncertainty model is generated or updated using the uncertainty values corresponding with the observation points. The uncertainty model indicates uncertainty associated with each portion of the lane model.

In addition to one or more of the features described herein, the controller obtains detections from the one or more sensors.

In addition to one or more of the features described herein, the one or more sensors include a camera, a lidar system, or a radar system.

In addition to one or more of the features described herein, the controller processes the detections to identify the lane line to obtain the observation points.

In addition to one or more of the features described herein, the controller determines the uncertainty value corresponding with each of the observation points.

In addition to one or more of the features described herein, the observation points and the uncertainty values are represented as mean and variance values, respectively.

In addition to one or more of the features described herein, the variance values are in square-meters.

In addition to one or more of the features described herein, the controller initializes or updates a first recursive least squares (RLS) adaptive filter to respectively generate or update the lane model using the observation points.

In addition to one or more of the features described herein, is initializes or updates a second RLS adaptive filter to respectively generate or update the uncertainty model using the uncertainty values.

In addition to one or more of the features described herein, the controller controls vehicle operation based on the lane model and the uncertainty model.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
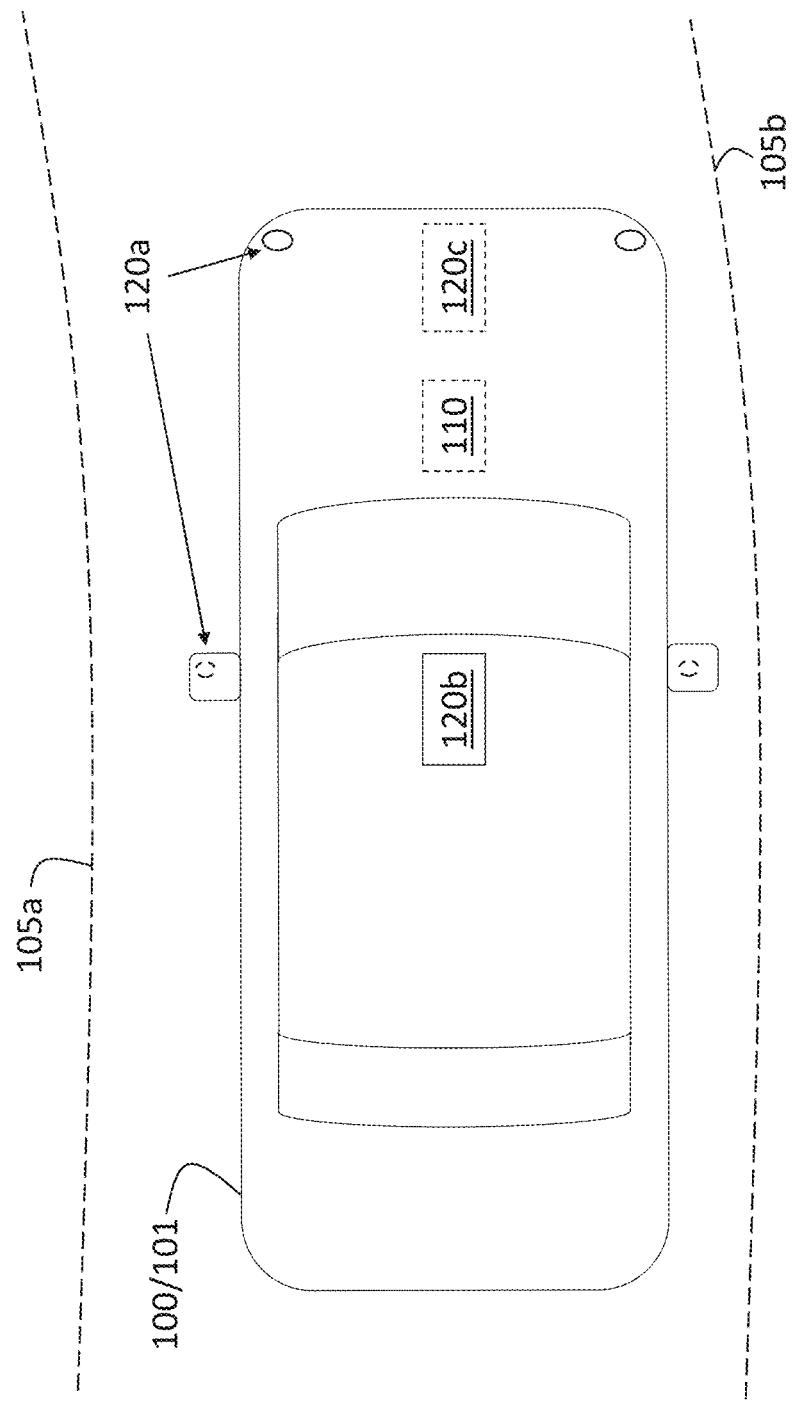
FIG. 1 is a block diagram of a vehicle that includes lane uncertainty modeling and tracking according to one or more embodiments.

The following description is merely exemplary in nature and is not intended to limit the present disclosure, its application or uses. It should be understood that throughout the drawings, corresponding reference numerals indicate like or corresponding parts and features.

As previously noted, lane models may be used to track lane lines and thereby facilitate semi-autonomous or autonomous operation of a vehicle. The observation points obtained from a lane line that are used to update the lane model may have different uncertainties associated with them. The uncertainty measure of model parameters of the lane model does not indicate the uncertainty specific to observation points that are used to update the lane model. Yet, the uncertainty associated with observation points facilitates understanding what portions of the lane line, according to the lane model, are associated with more or less uncertainty. Embodiments of the systems and methods detailed herein relate to lane uncertainty modeling and tracking in a vehicle. Specifically, in addition to the lane model, which is developed and updated using observation points, a separate lane uncertainty model is developed and updated using the uncertainty associated with each observation point.

In accordance with an exemplary embodiment, FIG. 1 is a block diagram of a vehicle 100 that includes lane uncertainty modeling and tracking. The exemplary vehicle 100 in FIG. 1 is an automobile 101. The vehicle 100 is shown within two lane lines 105a, 105b (generally 105). In order to perform semi-autonomous or autonomous control of the vehicle 100, the lane lines 105 in the vicinity of the vehicle 100 are modeled. Additionally, in accordance with one or more embodiments detailed herein, uncertainty associated with observation points 210 (FIG. 2) used to generate and update the lane models is also modeled and tracked.

The vehicle 100 includes a controller 110 that performs lane uncertainty modeling and tracking in addition to lane modeling and tracking, as further detailed with reference to FIG. 2. The controller 110 may additionally implement semi-autonomous or autonomous operation of the vehicle 100 based, in part, on the lane and lane uncertainty tracking. The controller 110 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

To perform the lane tracking, the controller 110 obtains observation points 210 from one or more sensors 120. Exemplary sensors 120 shown in FIG. 1 include cameras 120a, a lidar system 120b, and a radar system 120c (generally referred to as 120). One or more cameras 120a, the lidar system 120b, or a combination obtain detections that may include one or both of the lane lines 105. Processing of the detections by processing circuitry of the sensor 120 or by the controller 110 provides observation points 210 of one or both of the lane lines 105. This processing to obtain the observation points 210 is well-known. For example, one of the cameras 120a obtains detections in the form of images. Processing of the images may provide observation points 210 of the lane line 105a. The exemplary types, numbers, and positions of the sensors 120 shown in FIG. 1 are not intended to limit alternate arrangements of sensors 120 of the vehicle 100 or the sensors 120 that are used to obtain the observations points 210 used for lane and lane uncertainty modeling and tracking.

The uncertainty value 220 (FIG. 2) corresponding to each observation point 210 obtained from one or more sensors 120 is provided along with the observation point 210. Assuming a Gaussian distribution for the detections of a given lane 105 as one exemplary representation, the mean values represent the observation points 210 while the variances (σ) represent the uncertainty values 220. When fusion of more than one sensor 120 is used to provide observation points 210, then the processor that performs the fusion (e.g., controller 110) also determines the uncertainty value 220 associated with each observation point 210. For explanatory purposes, uncertainty is discussed in association with one sensor 120.

The uncertainty associated with observation points 210 can result from different factors. For example, uncertainty increases with the distance to the observation point 210 from the sensor 120. That is, a given sensor 120 may have a known relationship between distance and uncertainty. As another example, if an occlusion (e.g., an object, fog) prevents a portion of a lane line 105 from being visible to the sensor 120, the uncertainty of the observation point 210 that must be inferred in the occluded area (e.g., via interpolation using visible areas) is known to the sensor 120 or controller 110 based on the algorithm used to generate the observation point 210. Thus, as previously noted, each observation point 210 provided to the controller 110 to facilitate lane tracking is accompanied by an uncertainty value 220. As detailed, the uncertainty values 220 of the observation points 210 are used to facilitate lane uncertainty modeling and tracking according to one or more embodiments.

Figure 2:
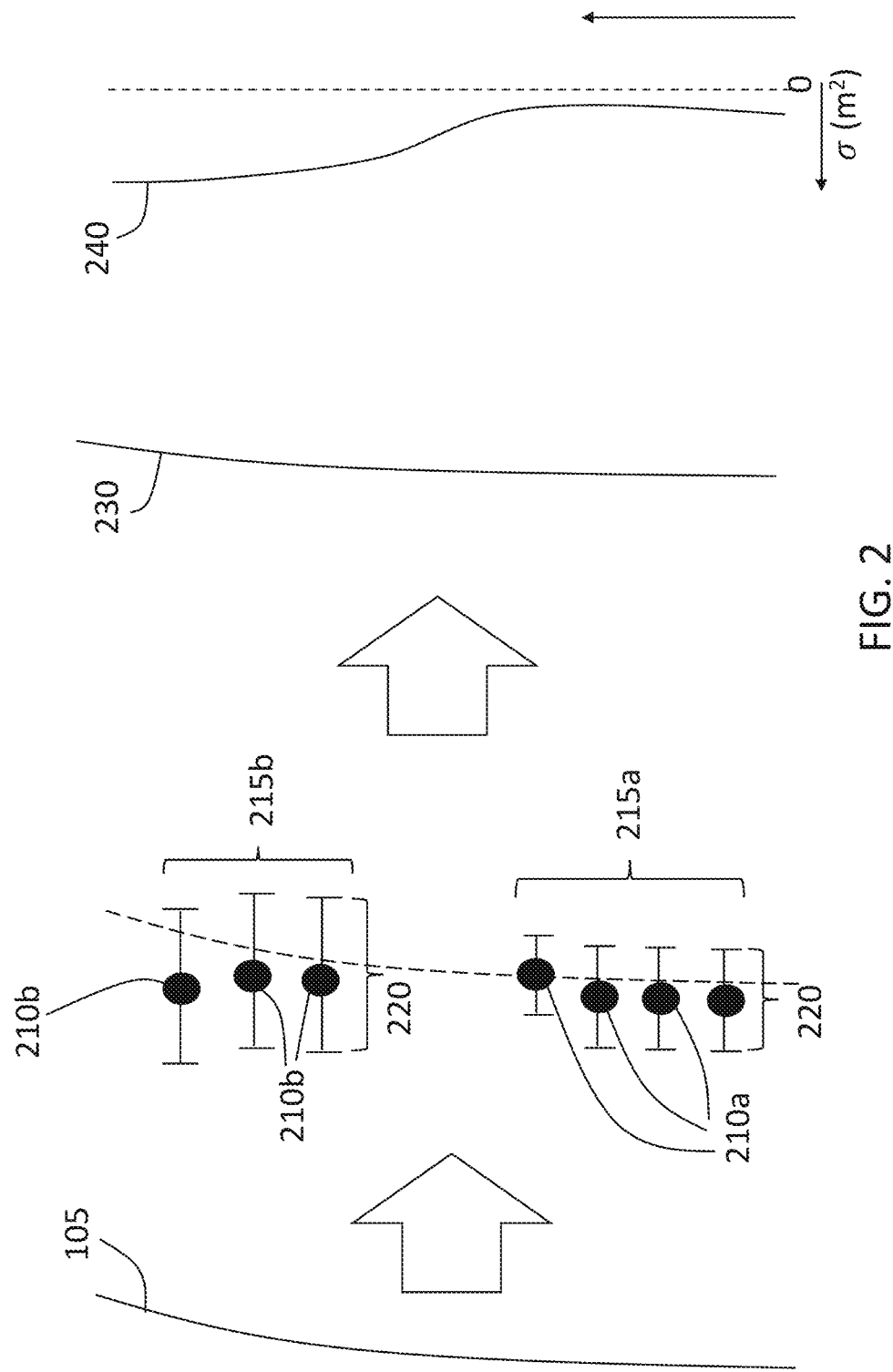
FIG. 2 illustrates a flow for obtaining a lane model and a lane uncertainty model according to one or more embodiments.

FIG. 2 illustrates a flow for obtaining a lane model 230 and a lane uncertainty model 240 according to one or more embodiments. An exemplary lane line 105 is shown. Based on the processing of detections obtained by one or more sensors 120, observation points 210 and associated uncertainty values 220 are obtained. As previously noted, the generation of observation points 210 and their corresponding uncertainty values 220 is known and not detailed here. The observation points 210 may be obtained as different sets 215a, 215b (generally referred to as 215) at different times (e.g., different frames obtained by a camera 120a). For example, one image obtained by a camera 120a may be processed to obtain the first set 215a of four observation points 210a and the next image obtained by the camera 120a may be processed to obtain the second set 215b of three observation points 210b.

As shown, each observation point 210 is within a range. The width of that range indicates the variance representing the uncertainty value 220. The uncertainty value 220 (i.e., variance a) may be obtained in square-meters. As FIG. 2 indicates, the uncertainty values 220 associated with each of the first set 215a of observation points 210a is less than the uncertainty values 220 associated with each of the second set 215b of observation points 210b. This increased uncertainty associated with observation points 210b in the second set 215b may be based on distance, for example. That is, the image used to generate observation points 210a of the first set 215a may have been obtained at a closer distance (i.e., closer to the area of the lane line 105 represented by the observation points 210a) than the image used to generate the observation points 210b of the second set 215b. The increased uncertainty may instead be based on occlusion as another example. That is, if the lane line 105 was obscured by fog, another vehicle, or any obstruction, the observation points 210b in the second set 215b may have been inferred and, thus, are associated with higher uncertainty values 220.

The observation points 210a and 210b are used to generate or update the lane model 230, and the associated uncertainty values 220 are used to generate or update the uncertainty model 240. The first set of observation points 210 pertaining to a lane line 105 are used the generate the lane model 230 for that lane line 105, and all subsequent observation points 210 that are obtained that pertain to that lane line 105 are used to update the lane model 230. Similarly, the uncertainty values 220 corresponding to the first set of observation points 210 pertaining to a lane line 105 are used to generate the uncertainty model 240, and uncertainty values 220 corresponding to all subsequent observation points 210 that are obtained that pertain to that lane line 105 are used to update the uncertainty model 240. As indicated, the uncertainty model 240 indicates the uncertainty (e.g., variance σ in square-meters m²) along a length l of the corresponding lane line 105.

The lane model 230 and uncertainty model 240 represent a curve fit on the observation points 210 and the uncertainty values 220, respectively. This curve fitting may be performed using a recursive least squares (RLS) adaptive filter, for example. According to alternate embodiments, other known algorithms may be used to generate and update the lane model 230 and uncertainty model 240. The known RLS adaptive filter algorithm is only generally described herein with reference to the uncertainty model 240. Equations relevant to the RLS adaptive filter are:

$$P_k = (\lambda_k P_{k-1}^{-1} + H_k^T R_k^{-1} H_k)^{-1} \quad [\text{EQ. 1}]$$

$$K_k = P_k H_k^T R_k^{-1} \quad [\text{EQ. 2}]$$

$$\bar{\theta}_{k|k} = \bar{\theta}_{k|k-1} + K_k(\bar{y}_k - H_k \bar{\theta}_{k|k-1}) \quad [\text{EQ. 3}]$$

Each uncertainty value 220 can be represented as (x, y), where x is distance (e.g., in meters) along the lane in the direction of travel of the vehicle 100, and y is the variance σ in m². In the case of the lane model 230, each observation point 210 is a location (x, y). $\bar{\theta}_k$ is the vector of coefficients of the uncertainty model 240 at iteration (or time) k, and $P_k$ is the covariance matrix of $\bar{\theta}_k$. These values are updated with each set of uncertainty values 220. $\lambda_k$ is a forgetting factor that gives exponentially less weight to older error samples. $H_k$ is a matrix that is a function of x and $R_k$ is an input noise matrix. Since $P_k$, $H_k$, and $R_k$ are known at EQ. 1, $K_k$, an update gaining matrix, may be solved according to EQ. 2 and used in EQ. 3 to determine the covariance matrix of $\bar{\theta}_k$.

Figure 3:
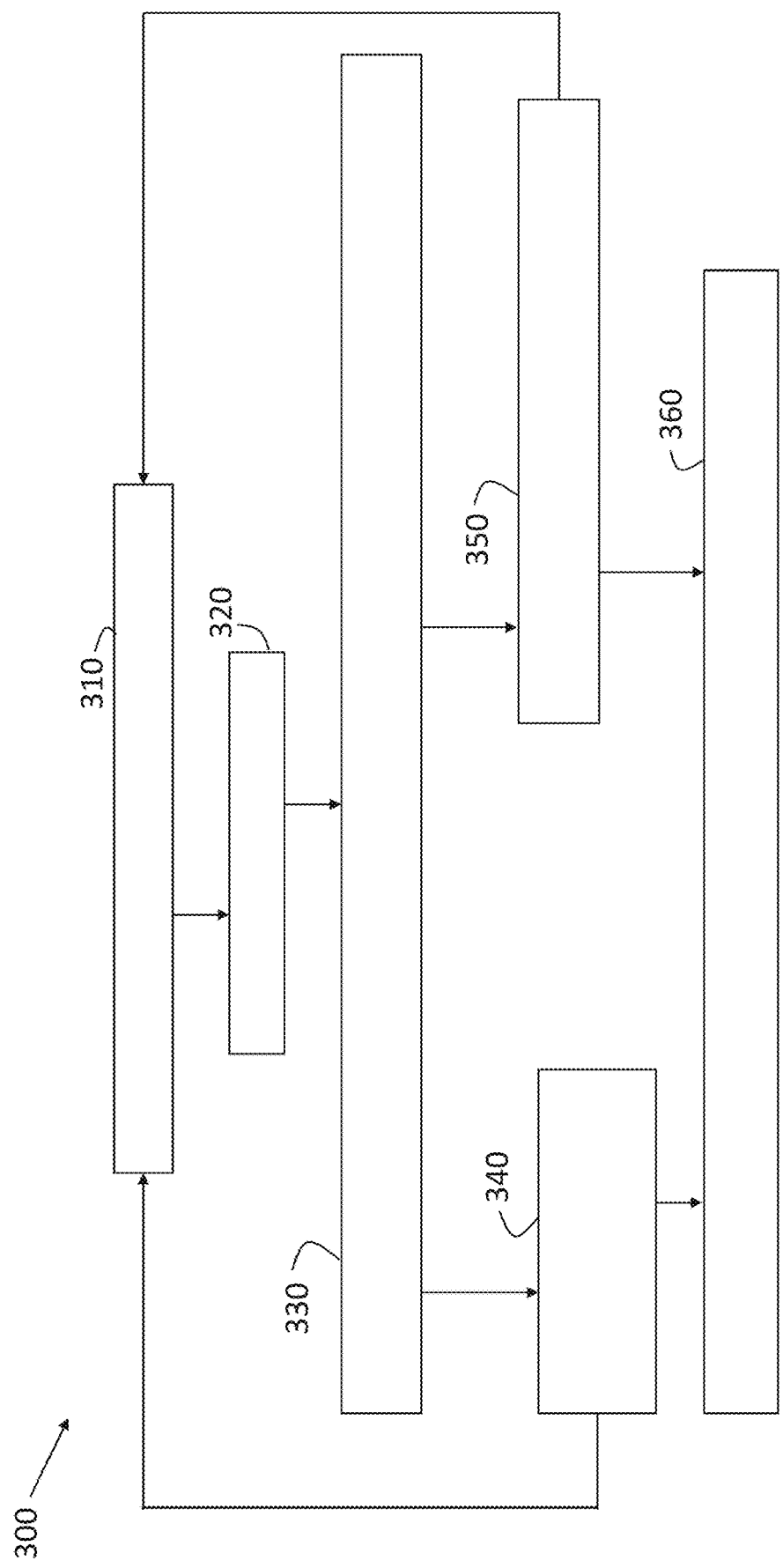
FIG. 3 is a process flow of a method of performing lane uncertainty modeling and tracking in a vehicle according to one or more embodiments.

FIG. 3 is a process flow of a method 300 of performing lane uncertainty modeling and tracking in a vehicle 100 according to one or more embodiments. At block 310, obtaining detections at one or more sensors 120 may include obtaining detections with one or more cameras 120a, lidar systems 120b, radar systems 120c, or a combination of sensors 120, for example.

Processing the detections, at block 320, includes identifying a lane line 105 and sampling points on the lane line 105 to obtain observation points 210. Each observation point 210 is an estimate of a location on the lane line 105. The estimate may be more or less accurate based on factors such as distance of the sensor 120 to the location and occlusion of the location to the sensor 120. This accuracy is reflected in the uncertainty value 220 that corresponds with each observation point 210. As previously noted, a given observation point 210 and corresponding uncertainty value 220 may be represented as a mean and variance. Processing circuitry of the one or more sensors 120 that obtained the detections (at block 310), the controller 110, or a combination may be used to process the detections at block 320.

At block 330, obtaining one or more observation points 210 and corresponding one or more uncertainty values 220 may be by the controller 110. At block 340, generating or updating a lane model 230 refers to initializing or updating an RLS adaptive filter, for example. At block 350, generating or updating an uncertainty model 240 refers to initialing or updating a different RLS adaptive filter, for example. The initializing of the lane model 230 (at block 340) and the initializing of the uncertainty model 240 (at block 350) are performed when detections are obtained for a given lane line 105 the first time. Subsequent detections of the same lane line 105 result in updating of the lane model 230 (at block 340) and updating of the uncertainty model 240 (at block 350). As indicated, the processes from blocks 310 through 350 are performed iteratively. Thus, the updating is performed for each new set of observation points 210 and corresponding uncertainty values 220 obtained at block 330 based on detections at block 310.

At block 360, the processes include controlling vehicle operation based on the lane model 230 and the corresponding uncertainty model 240. For example, in an autonomous vehicle 100, the lane model 230 may be used to determine a path for the vehicle 100 to follow (e.g., between two lane lines 105 based on their corresponding lane models 230). The separate uncertainty model 240 corresponding with each lane model 230 facilitates a granular understanding of the accuracy of the lane model 230. For example, if the uncertainty model 240 indicates an uncertainty of the lane model 230 that exceeds a threshold level at an upcoming area, then the controller 110 may control speed or other vehicle operation to mitigate for potential inaccuracy in the lane model 230 at that upcoming area.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method comprising:
    obtaining observation points of a lane line using one or more sensors of a vehicle, wherein each observation point indicates a location of a point on the lane line;
    obtaining uncertainty values, each uncertainty value corresponding with one of the observation points, wherein
    generating or updating a lane model using the observation points, wherein the lane model indicates a path of the lane line;
    generating or updating an uncertainty model using the uncertainty values corresponding with the observation points, wherein the uncertainty model indicates uncertainty associated with each portion of the lane model; and
    performing an autonomous operation of the vehicle based on the lane model and the uncertainty model.

2. The method according to claim 1, wherein the obtaining the observation points includes obtaining detections with the one or more sensors.

3. The method according to claim 2, wherein the one or more sensors include a camera, a lidar system, or a radar system.

4. The method according to claim 2, wherein the obtaining the observation points includes processing the detections, using a processor, to identify the lane line.

5. The method according to claim 4, wherein the obtaining the uncertainty values includes the processor determining the uncertainty value corresponding with each of the observation points.

6. The method according to claim 5, wherein the obtaining the observation points and the uncertainty values includes obtaining mean and variance values, respectively.

7. The method according to claim 6, wherein the obtaining the variance values includes obtaining values in square-meters.

8. The method according to claim 1, wherein the generating or updating the lane model using the observation points includes, respectively, initializing or updating a first recursive least squares (RLS) adaptive filter.

9. The method according to claim 8, wherein the generating or updating the uncertainty model using the uncertainty values includes, respectively, initializing or updating a second RLS adaptive filter.

10. A system comprising:
one or more sensors of a vehicle configured to provide observation points of a lane line, wherein each observation point indicates a location of a point on the lane line, and uncertainty values, each uncertainty value corresponding with one of the observation points; and
a controller configured to generate or update a lane model using the observation points, wherein the lane model indicates a path of the lane line, to generate or update an uncertainty model using the uncertainty values corresponding with the observation points, wherein the uncertainty model indicates uncertainty associated with each portion of the lane model, and to control an operation of a vehicle based on the lane model and the uncertainty model.

11. The system according to claim 10, wherein the controller is further configured to obtain detections from the one or more sensors.

12. The system according to claim 11, wherein the one or more sensors include a camera, a lidar system, or a radar system.

13. The system according to claim 11, wherein the controller is further configured to process the detections to identify the lane line to obtain the observation points.

14. The system according to claim 13, wherein the controller is further configured to determine the uncertainty value corresponding with each of the observation points.

15. The system according to claim 14, wherein the observation points and the uncertainty values are represented as mean and variance values, respectively.

16. The system according to claim 15, wherein the variance values are in square-meters.

17. The system according to claim 10, wherein the controller is configured to initialize or update a first recursive least squares (RLS) adaptive filter to respectively generate or update the lane model using the observation points.

18. The system according to claim 17, wherein the controller is configured to initialize or update a second RLS adaptive filter to respectively generate or update the uncertainty model using the uncertainty values.

* * * * *